United States Patent
Kurogi et al.

(10) Patent No.: US 8,008,594 B2
(45) Date of Patent: Aug. 30, 2011

(54) VACUUM INSULATED SWITCHGEAR

(75) Inventors: Takuya Kurogi, Hitachi (JP); Kenji Tsuchiya, Hitachi (JP); Daisuke Sugai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 12/172,332

(22) Filed: Jul. 14, 2008

(65) Prior Publication Data

US 2009/0020507 A1     Jan. 22, 2009

(30) Foreign Application Priority Data

Jul. 17, 2007    (JP) ................. 2007-185510

(51) Int. Cl.
*H01H 33/66*     (2006.01)
(52) U.S. Cl. ............... 218/119; 218/152; 218/154
(58) Field of Classification Search ............. 218/2–14, 218/44, 118–120, 140, 152–154
See application file for complete search history.

(56) References Cited

U.S. PATENT DOCUMENTS

| | | | | |
|---|---|---|---|---|
| 7,679,022 | B2 * | 3/2010 | Tsuchiya et al. | 218/120 |
| 2007/0175866 | A1 * | 8/2007 | Tsuchiya et al. | 218/10 |
| 2010/0243611 | A1 * | 9/2010 | Takahashi et al. | 218/139 |

FOREIGN PATENT DOCUMENTS

| | | |
|---|---|---|
| EP | 1 047 169 | 10/2000 |
| EP | 1 548 779 | 6/2005 |
| JP | 2006-059557 | 3/2006 |
| JP | 2006-258522 | 9/2006 |
| JP | 2007-014086 | 1/2007 |
| JP | 2007-209077 | 8/2007 |

\* cited by examiner

*Primary Examiner* — Renee Luebke
*Assistant Examiner* — Marina Fishman
(74) *Attorney, Agent, or Firm* — Mattingly & Malur, PC

(57) ABSTRACT

A vacuum insulated switchgear has a busbar compartment, in which phase-segregated double-break, three-position vacuum circuit breakers are disposed; and feeder compartments disposed at both sides of the busbar compartment respectively, in each of which phase-segregated double-break, three-position vacuum circuit breakers are disposed. The busbar compartment and the feeder compartments are aligned in a row, and a second-phase insulated busbar is provided to connect one of the fixed contacts of a second-phase breaker in the busbar compartment to a fixed contact of a second-phase breaker in one of the feeder compartments. A first-phase insulated busbar is provided to connect one of the fixed contacts of a first-phase breaker in the busbar compartment to a fixed contact of a first-phase breaker in one of the feeder compartments adjacent to the busbar compartment, and the second-phase insulated busbar and the first-phase insulated busbar are disposed in different positions in height.

9 Claims, 8 Drawing Sheets

VACUUM INSULATED SWITCHGEAR

CLAIM OF PRIORITY

The present application claims priority from Japanese patent application JP 2007-185510 filed on Jul. 17, 2007, the content of which is hereby incorporated by reference into this application.

BACKGROUND OF THE INVENTION

1. Field of the Invention

The present invention relates to a small, lightweight vacuum insulated switchgear with high reliability and performance and, more particularly, to a vacuum insulated switchgear that enables a busbar compartment and feeder compartments to be connected through insulated busbars.

2. Description of Related Art

In a power receiving facility, a closed electric panel (referred to below as a switchgear) is installed, which houses vacuum breakers for shutting down a current to a load or a fault current, disconnecting switches and earthing switches, which are used to ensure safety for operators who service and inspect the load, detecting units for detecting a system voltage and current, protective relays, and the like.

There are many methods of insulating switchgears of this type. Conventionally, air insulation panels and cubicle gas insulation switchgears (GISs), which use SF6 gas, have been used. Recently, a rapid shift to small components that use the solid insulation method, compressed air insulation method, and full vacuum insulation method is in progress in order to protect environments. To respond to this, a vacuum insulated switchgear has been suggested (in Patent Document 1, for example), in which double-break, three-position vacuum circuit breakers having breaking and disconnecting functions and earthing switches, which are vacuum insulated in the same way, are integrated by epoxy casting.

Patent Document 1: Japanese Patent Application Laid-open No. 2007-14086 (FIGS. 3 to 5)

SUMMARY OF THE INVENTION

The vacuum insulated switchgear described above is formed by integrating a vacuum container that includes double-break, three-position vacuum circuit breakers having breaking and disconnecting functions and another vacuum container that includes circuit breakers, each of which has an earth container, are integrated by epoxy casting and included in a chassis. The vacuum insulated switchgear is small and lightweight and has high reliability, so it can meet needs for reduction in size and weight of important power distributing facilities in, for example, urban areas.

Demands of users for recent power receiving and transfer facilities have been diversified. For example, load types and operating conditions differ depending on the use of an incoming transfer facility by the user, so a distribution system is planned in consideration of safety, reliability, operation maintainability required by the customer, and an increase in future load. In the distribution plan, consideration must also be taken for control of a breaker, a disconnecting switch, an earthing switch, and other components that constitute the power receiving and transfer facility, and for monitoring and measurement of voltage, current, electrical power, and the like. In this situation, it becomes an important factor to reduce installation spaces for the above devices and devices for controlling, monitoring, and measuring them so as to suppress an investment for the installation. The above small, lightweight vacuum insulated switchgear with high reliability can flexibly meet these users' various demands.

A variety row structures of switchgears comprise a combination of various compartments for power reception, measurement, insulated busbar switching, and feeding. For example, suppose that double-break, three-position vacuum circuit breakers having breaking and disconnecting functions are used as a busbar compartment B, and feeder compartments FR and FL, each of which includes vacuum circuit breakers having a breaking function, are disposed at both sides of the busbar compartment. Since there is a difference in depth dimension between the busbar compartment B and the feeder compartments FR and FL, connectors for connecting the busbar compartment B to the feeder compartments FR and FL through insulated busbars cannot be aligned. This poses a problem in that insulated busbars in phases cannot be disposed side by side in the width direction of each compartment.

An object of the present invention is to provide a small, lightweight vacuum insulated switchgear with high reliability that suppresses busbar interference that would otherwise be caused between compartments when they are aligned in a row in the vacuum insulated switchgear, and thereby enables the insulated busbars to be connected without interference.

To achieve the above object, a first aspect of the present invention, which is a vacuum insulated switchgear, comprising a busbar compartment, in which phase-segregated double-break, three-position vacuum circuit breakers are disposed, feeder compartments disposed at both sides of the busbar compartment respectively, in each of which phase-segregated double-break, three-position vacuum circuit breakers are disposed, and the busbar compartment and the feeder compartments being aligned in a row, characterized in that, a second-phase insulated busbar is provided to connect one of fixed contacts of a second-phase breaker in the busbar compartment to a fixed contact of a second-phase breaker in one of the feeder compartments adjacent to the busbar compartment, a first-phase insulated busbar is provided to connect one of fixed contacts of a first-phase breaker in the busbar compartment to a fixed contact of a first-phase breaker in one of the feeder compartments adjacent to the busbar compartment, and the second-phase insulated busbar and the first-phase insulated busbar are disposed a different position in height each other.

In a second aspect of the present invention, the second-phase insulated busbar, in the first aspect, is disposed at lower position than the position of the first-phase insulated busbar.

In a third aspect of the present invention, the first-phase insulated busbar and second-phase insulated busbar in the second aspect are each a linear solid insulated busbar.

A fourth aspect of the present invention is a vacuum insulated switchgear comprising a busbar compartment, in which phase-segregated double-break, three-position vacuum circuit breakers are disposed, feeder compartments disposed at both sides of the busbar compartment respectively, in each of which phase-segregated double-break, three-position vacuum circuit breakers are disposed, and the busbar compartment and the feeder compartments are aligned in a row, characterized in that, an insulated busbar is provided to connect one of the fixed contacts of the each phase of breaker in the busbar compartment to a fixed contact of the each phase of breaker in one of the feeder compartments adjacent to the busbar compartment, respectively, and the insulated busbar is composed of one linear insulated busbar and two bent insulated busbars.

In a fifth aspect of the present invention, the insulated busbar, in the fourth aspect, for connecting the one of fixed contact of the first-phase breaker in the busbar compartment to the fixed contact of the first-phase breaker in one of the feeder compartment is a linear insulated busbar, and the insulated busbar for connecting the one of fixed contact of the second-phase breaker in the busbar compartment to the fixed contact of the second-phase breaker in one of the feeder compartment and the insulated busbar for connecting the one of fixed contact of the third-phase breaker in the busbar compartment to the fixed contact of the third-phase breaker in one of the feeder compartment are each a bent insulated busbar.

In a sixth aspect of the present invention, the busbar compartment and feeder compartments in any one of the first or the fourth aspects, the each fixed contact of the each-phase of breaker in the busbar compartment and the feeder compartment is disposed at lower side of the movable contact of the each-phase of breaker, and the insulated busbar is disposed at lower side of the breaker.

In a seventh aspect of the present invention, the busbar compartment and feeder compartments in any one of the first or the fourth aspects, the each fixed contact of the each-phase of breaker in the busbar compartment and the feeder compartment is disposed at higher side of the movable contact of the each-phase of breaker, and the insulated busbar is disposed at upper side of the breaker.

According to the present invention, even when the breakers in compartments which are aligned in a row in a vacuum insulated switchgear have different depths, the insulated busbars can be connected between compartments without interference, so that the compartments can be aligned in a row without having to change the positions of the breakers in the compartments in their depth directions. It then becomes possible to prevent an area in which to mount the vacuum insulated switchgear from being enlarged.

DETAILED DESCRIPTION OF THE PREFERRED EMBODIMENTS

The vacuum insulated switchgear of the embodiment in the present invention will be described below with reference to the drawings.

Figure 1:
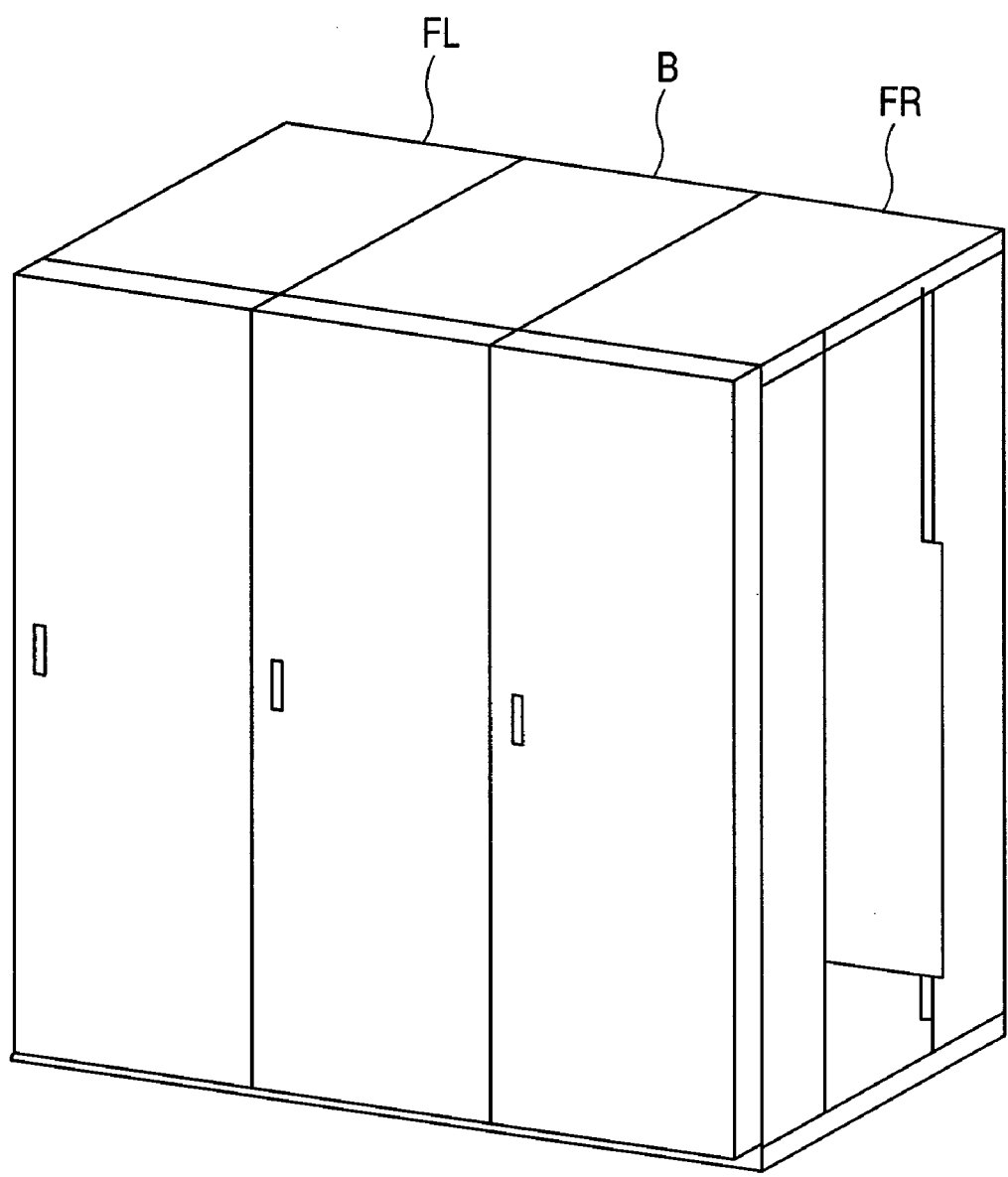
FIG. 1 is a perspective view of a vacuum insulated switchgear in an embodiment of the present invention, in which a busbar compartment and feeder compartments are aligned in a row.
Figure 2:
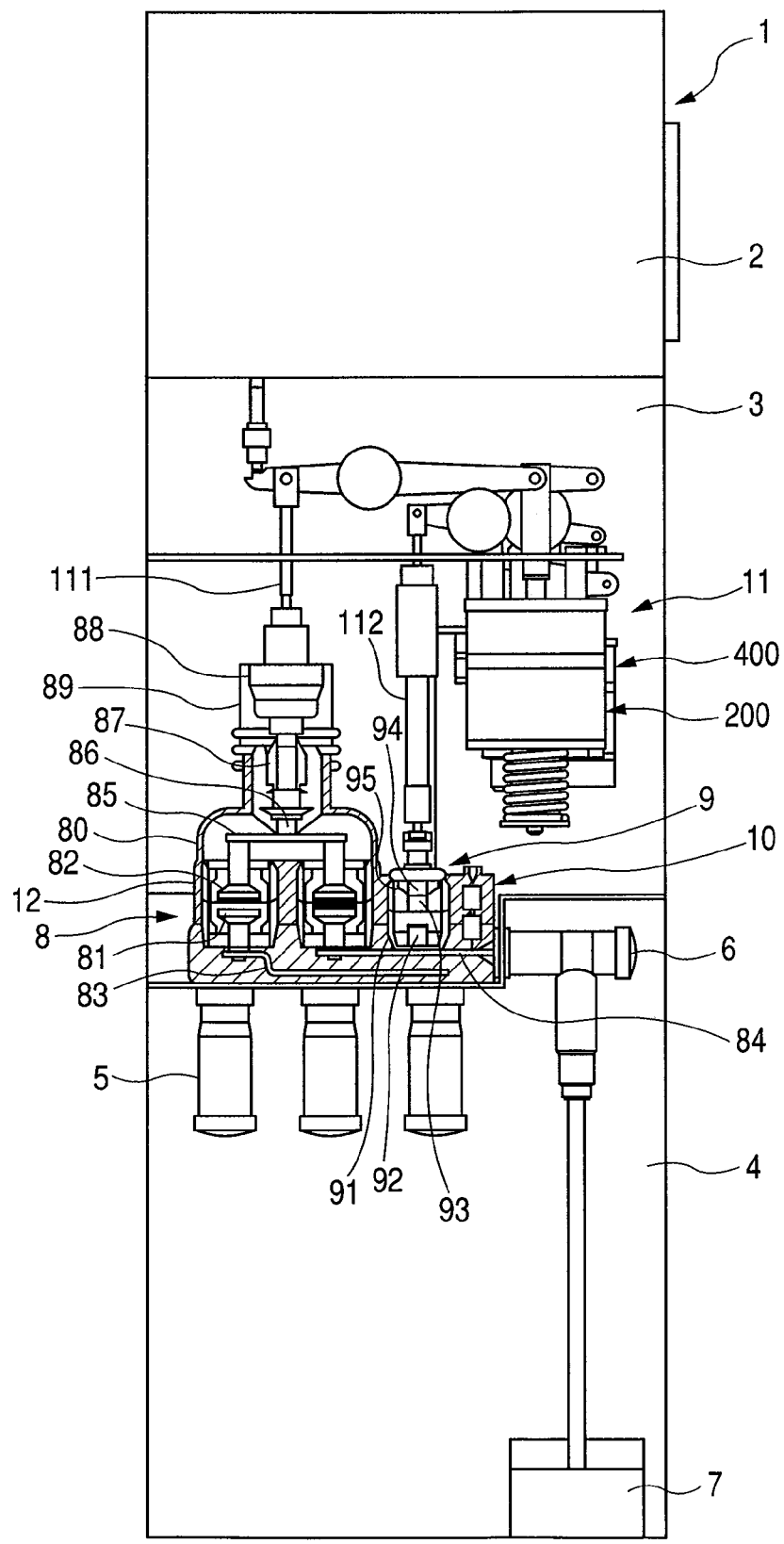
FIG. 2 is a vertical sectional view of the feeder compartment in the vacuum insulated switchgear of the embodiment shown in FIG. 1.
Figure 3:
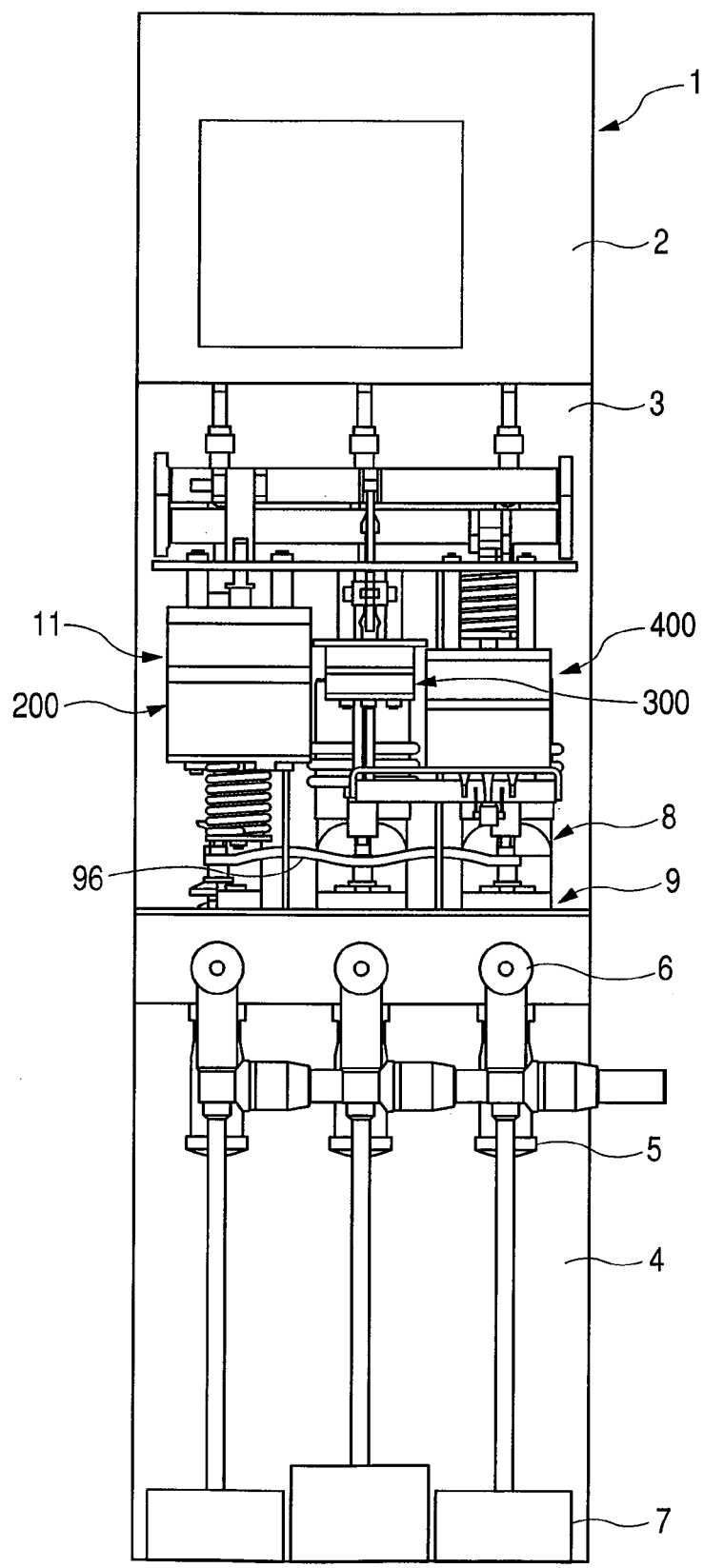
FIG. 3 is a front view of the feeder compartment in the vacuum insulated switchgear of the embodiment shown in FIG. 2.
Figure 4:
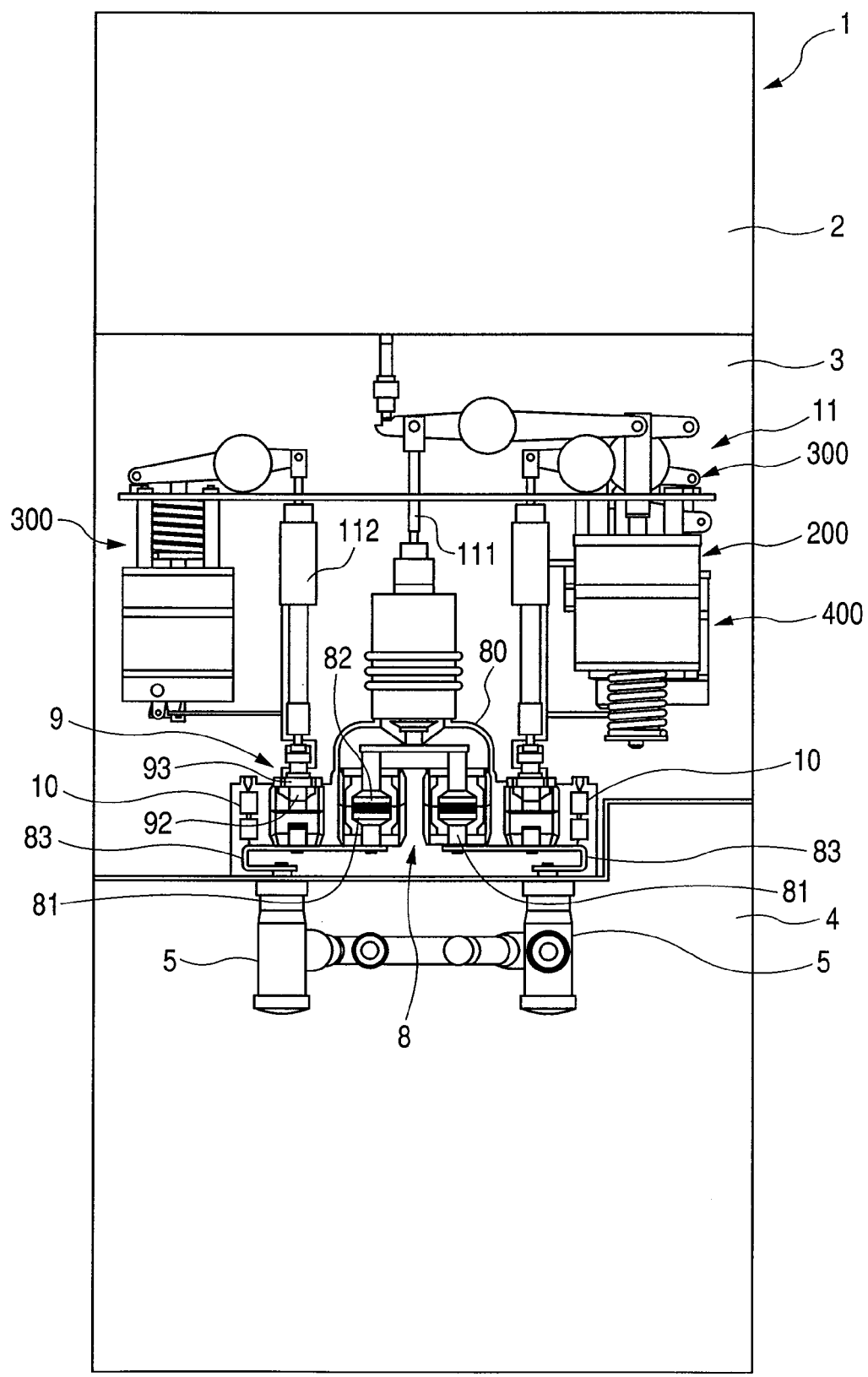
FIG. 4 is a vertical sectional view of the busbar compartment in the vacuum insulated switchgear of the embodiment shown in FIG. 1.
Figure 5:
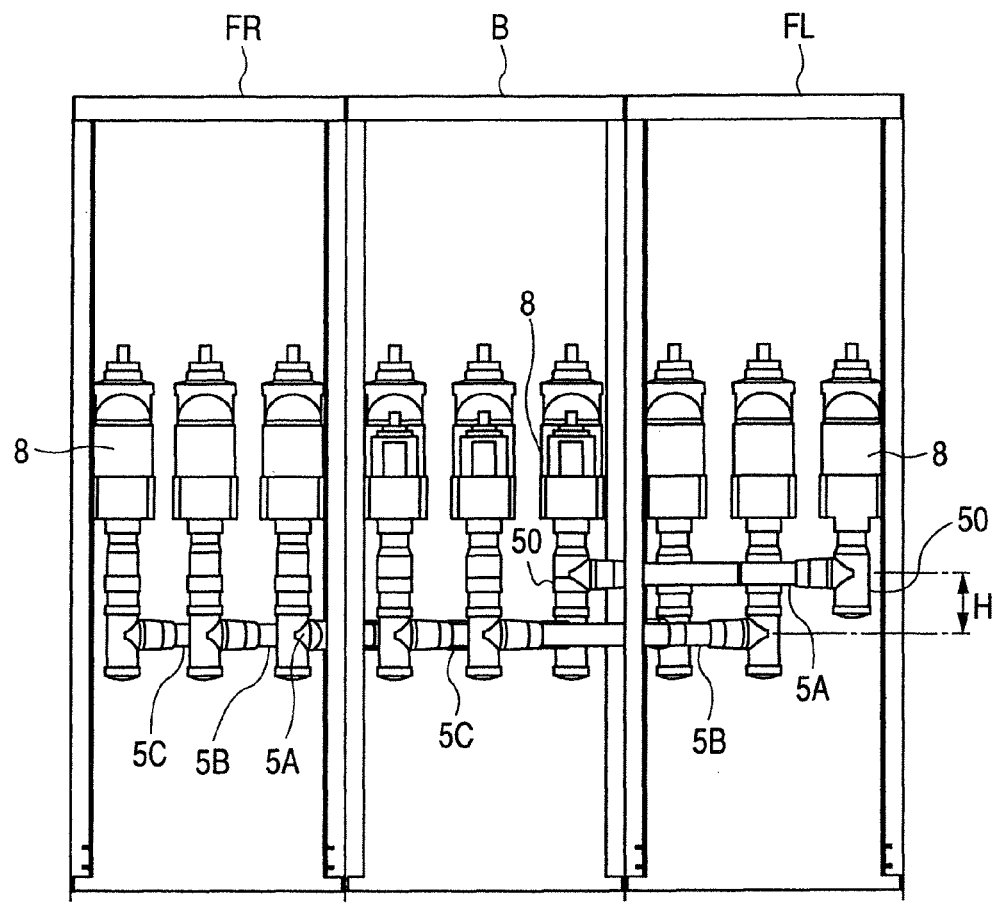
FIG. 5 is a rear view of the vacuum insulated switchgear in the embodiment shown in FIG. 1.
Figure 6:
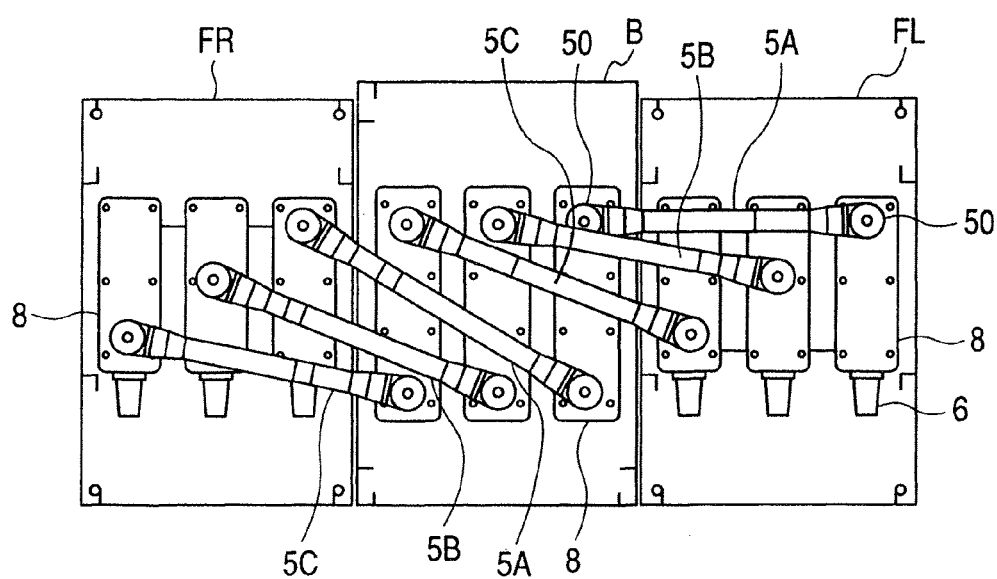
FIG. 6 is a bottom plan view of the vacuum insulated switchgear in the embodiment shown in FIG. 5.

FIGS. 1 to 6 illustrate an embodiment of the vacuum insulated switchgear in the present invention. FIG. 1 is a perspective view of the vacuum insulated switchgear, which embodies the present invention, in which a busbar compartment and feeder compartments are aligned in a row. FIG. 2 is a vertical sectional view of the vacuum insulated switchgear shown in FIG. 1. FIG. 3 is a front view of one feeder compartment of the vacuum insulated switchgear shown in FIG. 1. FIG. 4 is a vertical sectional view of the busbar compartment of the vacuum insulated switchgear shown in FIG. 1. FIG. 5 is a rear view of the vacuum insulated switchgear shown in FIG. 1. FIG. 6 is a bottom plan view of the vacuum insulated switchgear shown in FIG. 5.

In FIG. 1, the vacuum insulated switchgear, which embodies the present invention, comprises a busbar compartment B, a feeder compartment FR, which is disposed to the right of the busbar compartment B, and a feeder compartment FL, which is disposed to the left of the busbar compartment B; these compartments are arranged in a row. The feeder compartments FR and FL each includes, in a chassis 1, a low-voltage control compartment 2, a high-voltage switch compartment 3, insulated busbars 5, and cable compartments 4 in that order from the top, as shown in FIGS. 2 and 3.

The cable compartment 4 includes insulated busbars 5, which are solid insulated, a cable sealing end 6 on a line side, a bushing 7, and the like. The high-voltage switch compartment 3 includes double-break, three-position vacuum circuit breakers (double-break, three-position breaker/disconnecting vacuum circuit breakers) 8, an earthing switch 9 having a vacuum closed container, a voltage detector 10, and an operation device 11.

The insulated busbar 5 uses solid insulation instead of using a gas, ensuring its easiness of handling and safety. The voltage detector 10 also detects a corona generated due to a reduced degree of vacuum in the vacuum closed container, improving maintainability.

The double-break, three-position vacuum circuit breaker 8, earthing switch 9 having the vacuum closed container, and voltage detector 10, which are all disposed in the above-described high-voltage switch container 3, are integrally molded with an epoxy resin 12, as shown in FIGS. 2 and 3. Accordingly, the switch portion is unitized and made compact and lightweight. The unitized three-phase switch portion has a segregated phase structure in which the three phases are disposed side by side in the width direction of the chassis 1. Shielding plates are disposed among the phases, suppressing short-circuit faults among them. An outer surface of the mold is grounded by a conductive coating material applied to the surface, ensuring safe contact.

The structure of the unitized switch portion will be further explained in detail with reference to FIG. 2. The double-break, three-position vacuum circuit breaker 8 comprises a vacuum container 80 having an insulation tube, two fixed contacts 81 contained in the vacuum container 80, and corresponding movable contacts 82, forming a double-break structure. The movable contact 82 can be connected to and disconnected from corresponding the fixed contacts 81.

One of the fixed contacts 81, on the left of FIG. 2, is connected to the insulated busbar 5 through a conductor 83. The other of the fixed contacts 92, on the right of FIG. 2, is connected to the cable sealing end 6 through a conductor 84.

The movable contacts 82 are connected to each other by use of a movable conductor 85 reinforced by stainless steel or another metal that is not annealed at high temperature. A vacuum insulation operation rod 86 is connected to the movable conductor 85. The vacuum insulation operation rod 86 extends outwardly of the vacuum container 80 through a metal bellows 87, and connected to an air insulation operation rod 88. The air insulation operation rod 88 is connected to an operation rod 111 operated by the operation device 11.

The movable contacts 82 are stopped at three positions by the operation rod 111, that is, at a closed position Y1 for conduction, an open position Y2 for breaking current, and a disconnecting position Y3 for protecting an inspection operator against a surge voltage caused by, for example, lightning.

As shown in FIG. 2, the above-described air insulation operation rod 88 is covered with the bellows 89, which is made of rubber or metal, and thereby shielded from the air. Accordingly, insulation reliability for prolonged use of the air insulation operation rod 88 is ensured.

As shown in FIG. 2, the earthing switch 9 having the vacuum closed container comprises a vacuum container 91 having an insulation tube, fixed contacts 92 fixed in the vacuum container 91 and connected to the feeder 84, and movable contacts 93 corresponding to the fixed contacts 92. The movable contact 82 can be connected to and disconnected from corresponding the fixed contacts 81. A vacuum insulated operating rod 94 is connected to the movable contacts 93. The vacuum insulated operating rod 94 extends outwardly of the vacuum container 91 through a metal bellows 95 and is connected to an insulation operation rod 112 for the earthing switch. The vacuum container 80, vacuum container 91, and insulation operation rod 112 are made of stainless steal to improve their environmental resistance. The movable contacts 93 are connected to each other through a conductor 96, as shown in FIG. 3.

The operation device 11 is used to switch the breaker 8 to one of three positions, which are the closed position Y1 for conduction, the open position Y2 for breaking current, and the disconnecting position Y3 for protecting an inspection operator against a surge voltage caused by, for example, lightning and to turn on and off the earthing switch 9. The operation device 11 generally comprises a first operation mechanism 200 for switching the movable contacts 82 of the breaker 8 between the closed position Y1 and open position Y2, a second operation mechanism 300 for switching the movable contacts 82 of the breaker 8 between the open position Y2 and disconnect position Y3, and a third operation mechanism 400 for operating the movable contacts 93 of the earthing switch 9.

FIG. 4 shows the structure of the busbar compartment B, in which the same reference numerals as in FIGS. 2 and 3 indicate corresponding or equivalent parts in FIGS. 2 and 3. In the busbar compartment B in FIG. 4, the double-break, three-position vacuum circuit breaker 8 is used as a double-break, three-position load breaking and disconnecting vacuum circuit breaker. Each of the fixed contacts 81 of the breaker 8 is connected to the solid insulated busbar 5 by use of the conductor 83. The earthing switch 9 is connected to the conductor 83.

Although the feeder compartments FR and FL are disposed at both sides of the busbar compartment B so that they are aligned in a row, connectors for connecting the feeder compartments FR and FL to the busbar compartment B through the insulated busbars may not be aligned in a row due to a dimensional difference in the depth direction (the lateral direction in FIGS. 2 and 3) caused by a difference in the structure between the busbar compartment B and the feeder compartments FR and FL. A busbar connection structure in which the busbar compartment B and feeder compartments FR and FL are aligned in a row so as to solve this problem will be described with reference to FIGS. 5 and 6.

FIG. 5 is a rear view of the vacuum insulated switchgear shown in FIG. 1, which embodies the present invention. FIG. 6 is a bottom plan view of the vacuum insulated switchgear in FIG. 5; the lower part in FIG. 6 is the front of the vacuum insulated switchgear. The phases in the feeder compartment FR, the busbar compartment B, and feeder compartment FL are denoted a first phase, second phase, and third phase from right to left in FIGS. 5 and 6. The fixed contacts in one side of the breakers 8, each of which is a phase, (the lower fixed contacts in FIG. 6) in the busbar compartment B are connected to the corresponding fixed contacts of the breakers 8 (first to third phases) in the feeder compartment FR through connectors 50 and insulated busbars 5A, 5B, and 5C. The fixed contacts in the other side (the upper fixed contacts in FIG. 6) in the busbar compartment B are connected to the corresponding fixed contacts of the breakers 8 (first to third phases) in the feeder compartment FL through other connectors 50 and other busbars 5A, 5B, and 5C. If the connector 50 in each phase of the busbar compartment B is same length, the connector 50 connected to the first phase in the busbar compartment B causes interference with the insulated busbar 5B that connects the fixed contact of the second phase in the busbar compartment B to the fixed contact of the second phase in the feeder compartment FL.

To prevent this interference, as shown in FIG. 5, the insulated busbar 5B of the second phase in the feeder compartment FL is connected to the connector 50 that is longer than the connector 50 on the first phase in the feeder compartment FL so that the insulated busbar 5B of the second phase in the feeder compartment FL is lowered by H relative to the insulated busbar 5A connected to the first phase in the feeder compartment FL.

In FIGS. 5 and 6, although the insulated busbar 5C connected to the third phase in the feeder compartment FL and insulated busbars 5A, 5B, and 5C respectively connected to the first, second, and third phases in the feeder compartment FR are at the same height as the insulated busbar 5B connected to the second phase in the feeder compartment FL, these insulated busbars may be at the same height as the insulated busbar 5A connected to the first phase in the feeder compartment FL.

According to the embodiment described above, when the height of the insulated busbar connected to at least one phase in a feeder compartment adjacent to the busbar compartment B is changed, busbar interference can be avoided and thereby straight insulated busbars can be used to connect the connectors. Accordingly, special molds and the like do not need to be used to manufacture the insulated busbars; it suffices to change on their lengths. Furthermore, when compartments are aligned in a row, the insulated busbars can be connected without the need to change the heights of the compartments. As result, an inexpensive, safety, easy-to-make busbar connection can be provided.

There may be a pole or facility behind a feeder compartment. Then, when the compartments are disposed in a row, their fronts cannot be flushed, and the feeder compartment needs to be positioned forward relative to the busbar compartment B. Even in this case, the compartments can be aligned in a row just by changing the length of an insulated busbar. This is advantageous in that the compartments can be installed flexibly.

Figure 7:
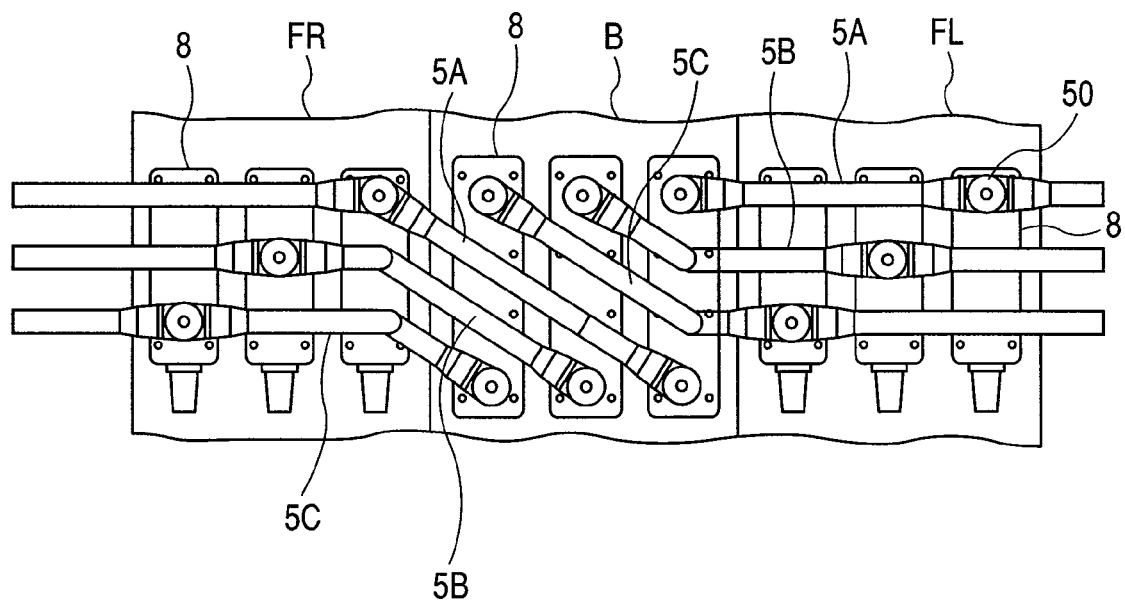
FIG. 7 is a bottom plan view of a vacuum insulated switchgear in another embodiment of the present invention.
Figure 8:
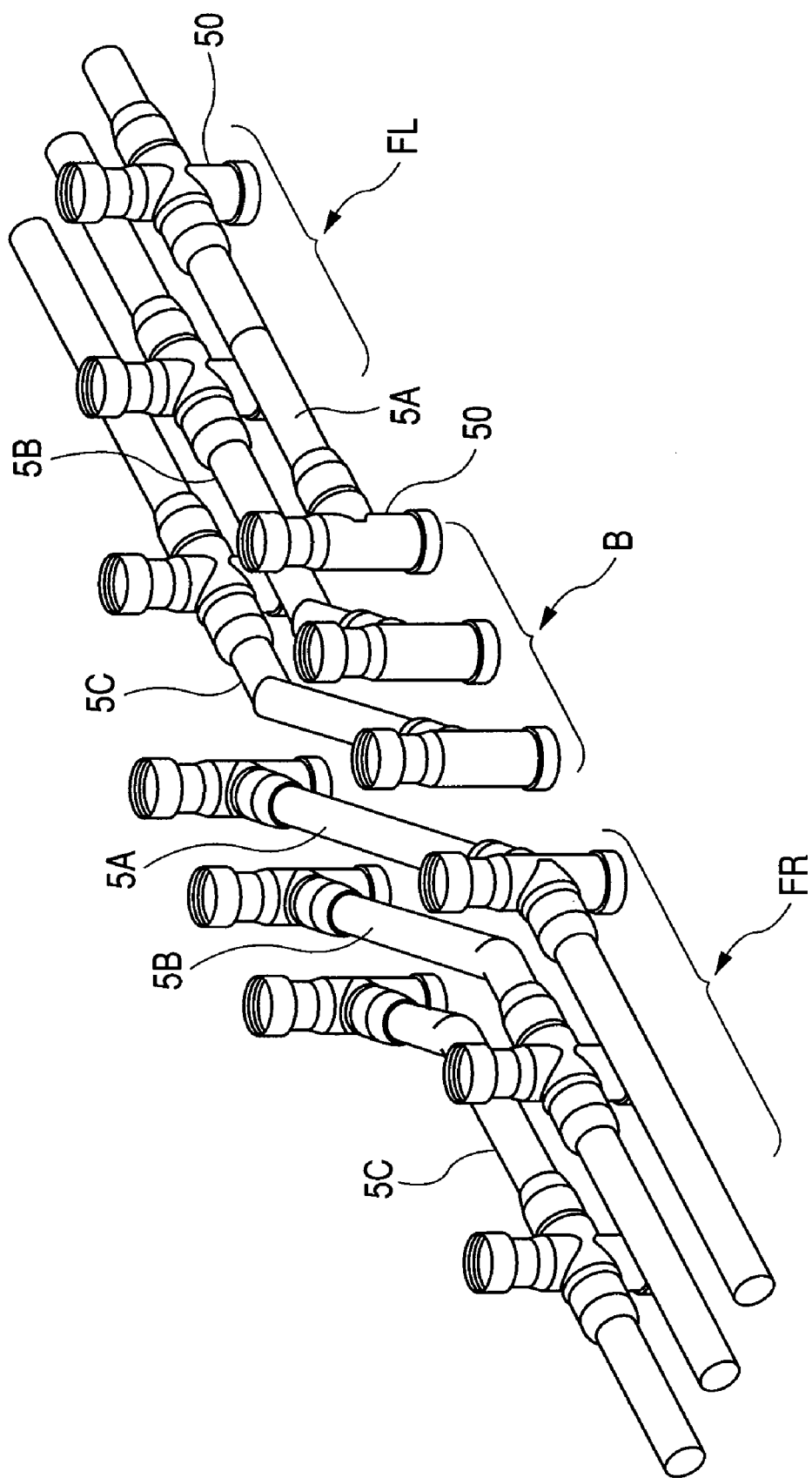
FIG. 8 is a perspective view of the insulated busbars in the vacuum insulated switchgear of the embodiment shown in FIG. 7.

FIGS. 7 and 8 illustrate another embodiment of the vacuum insulated switchgear according to the present invention; FIG. 7 is a bottom plan view of the vacuum insulated switchgear in the another embodiment of the present invention, and FIG. 8 is a perspective view of the insulated busbars in the vacuum insulated switchgear in the embodiment shown in FIG. 7. The parts in these drawings are assigned the same reference numerals as in FIGS. 5 and 6; the same reference numerals indicate identical or equivalent parts.

In busbar connection in this embodiment in which the fixed contacts on one side (lower fixed contacts in FIG. 7) of the breakers 8 (first to third phases) in the busbar compartment B are connected to the fixed contacts of the breakers 8 (first to third phases) in the feeder compartment FR, the insulated busbar connected to the first phase through the connector 50 is a linear insulated busbar 5A, and the insulated busbars connected to the second and third phases through the connectors 50 are respectively bent insulated busbars 5B and 5C.

In busbar connection in this embodiment in which the fixed contacts on the other side (upper fixed contacts in FIG. 7) of the breakers 8 (first to third phases) in the busbar compartment B are connected to the fixed contacts of the breakers 8 (first to third phases) in the feeder compartment FL, the insulated busbar connected to the first phase through the connector 50 is a linear insulated busbar 5A, and the insulated busbars connected to the second and third phases through the connectors 50 are respectively bent insulated busbars 5B and 5C, as in the busbar connection between the busbar compartment B and the feeder compartment FR.

According to the another embodiment described above, when the busbar compartment B and the feeder compartments FR and FL adjacent to it are aligned in a row, one linear insulated busbar 5A and two bent insulated busbars 5B and 5C can be used to avoid busbar interference. Inter-phase insulation distances between busbars can also be ensured, so protection against high current is achieved. Furthermore, when the compartments are aligned in a row, the insulated busbars can be connected without the need to change heights of the compartments. As a result, an inexpensive, safety, easy-to-make busbar connection can be provided.

As described above, there may be a pole or facility behind a feeder compartment. Then, when the compartments are disposed in a row, their fronts cannot be flushed, and the feeder compartment needs to be positioned forward relative to the busbar compartment B. Even in this case, the compartments can be aligned in a row just by changing the length of an insulated busbar. This is advantageous in that the compartments can be installed flexibly.

Figure 9:
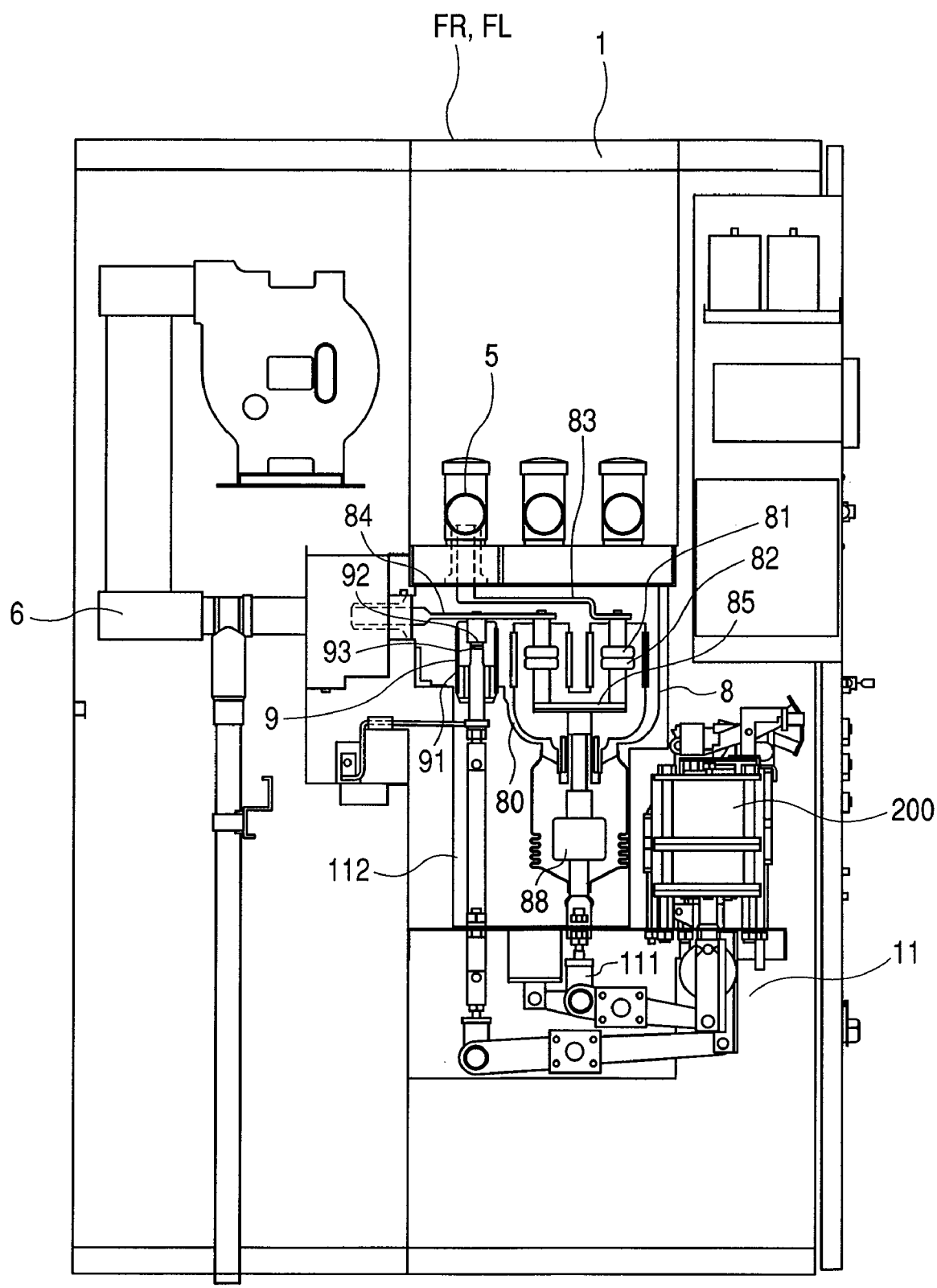
FIG. 9 is a vertical sectional view of the vacuum insulated switchgear in still another embodiment of the present invention.

In the embodiment described above, the cable sealing ends 6 are disposed on the front. Even when, however, the cable sealing ends 6 are disposed on the back, the present invention is applicable, as shown in FIG. 9. In this embodiment shown in FIG. 9, the fixed contacts 81 of the breakers 8 in the feeder compartments FR and FL are disposed on the upper side of the corresponding movable contacts 82, and the fixed contacts 81 of the breakers 8 in the busbar compartment B are also disposed on the upper side of the corresponding movable contacts 82, as shown in FIG. 9, and then the busbar compartment B is connected to the adjacent feeder compartments FR and FL with the insulated busbars 5 at the upper side of the breakers 8, the present invention is also applicable. That is, the busbar connections shown in FIGS. 5 to 8 enable the busbar compartment B to be connected to the adjacent feeder compartments FR and FL without busbar interference.

In this case as well, the same effect as in the embodiment described earlier can be obtained.

What is claimed is:

1. A vacuum insulated switchgear comprising:
   a busbar compartment, in which phase-segregated double-break, three-position vacuum circuit breakers are disposed;
   feeder compartments disposed at both sides of the busbar compartment respectively, in each of which phase-segregated double-break, three-position vacuum circuit breakers are disposed, with the busbar compartment and the feeder compartments being aligned in a row;
   a first-phase insulated busbar disposed to connect one of fixed contacts of a first-phase breaker in the busbar compartment to a fixed contact of a first-phase breaker in one of the feeder compartments adjacent to the busbar compartment through a first connector;
   a second-phase insulated busbar disposed to connect one of fixed contacts of a second-phase breaker in the busbar compartment to a fixed contact of a second-phase breaker in one of the feeder compartments adjacent to the busbar compartment through a second connector; and
   a third-phase insulated busbar disposed to connect one of fixed contacts of a first-phase breaker in the busbar compartment to a fixed contact of a first-phase breaker in one of the feeder compartments adjacent to the busbar compartment through a third connector,
   wherein the second connector is longer in length than the first connector, the second connector is disposed at a lower position than the first-phase insulated busbar, and the third connector has a length which is the same as the first connector or the second connector and is disposed at the same height as the first-phase insulated busbar or the second-phase insulated busbar.

2. The vacuum insulated switchgear according to claim 1, wherein the second-phase insulated busbar is disposed at a lower position than the position of the first-phase insulated busbar.

3. The vacuum insulated switchgear according to claim 2, wherein the first-phase insulated busbar and the second-phase insulated busbar are each a linear solid insulated busbar.

4. The vacuum insulated switchgear according to claim 1, wherein:
   each fixed contact of the circuit breakers in the busbar compartment and the feeder compartments are disposed at a lower side of the movable contact of the circuit breakers, and the insulated busbar is disposed at a lower side of the circuit breakers.

5. The vacuum insulated switchgear according to claim 1, wherein:
   each fixed contact of the circuit breakers in the busbar compartment and the feeder compartments are disposed at a higher side of the movable contact of the circuit breakers, and the insulated busbar is disposed at an upper side of the circuit breakers.

6. A vacuum insulated switchgear comprising:
   a busbar compartment, in which phase-segregated double-break, three-position vacuum circuit breakers are disposed;
   feeder compartments disposed at both sides of the busbar compartment respectively, in each of which phase-segregated double-break, three-position vacuum circuit breakers are disposed, with the busbar compartment and the feeder compartments being aligned in a row;
   a first insulated busbar disposed to connect a connector which is connected to one of plural fixed contacts of a first-phase breaker in the busbar compartment to another connector which is connected to a fixed contact of a first-phase breaker in one of the feeder compartments adjacent to the busbar compartment; and
   a second insulated busbar disposed to connect a connector which is connected to one of plural fixed contacts of a second-phase breaker in the busbar compartment to another connector which is connected to a fixed contact of a second-phase breaker in one of the feeder compartments adjacent to the busbar compartment, wherein the first insulated busbar is a linear insulated busbar, and
wherein the second insulated busbar is a bent insulated busbar.

7. The vacuum insulated switchgear according to claim 6, further comprising:
a third insulated busbar for connecting the one of plural fixed contacts of a third-phase breaker in the busbar compartment to a fixed contact of a third-phase breaker in one of the feeder compartments, wherein the third insulated busbar is a bent insulated busbar.

8. The vacuum insulated switchgear according to claim 4, wherein:
each fixed contact of the circuit breakers in the busbar compartment and the feeder compartments are disposed at a lower side of the movable contact of the circuit breakers, and the insulated busbar is disposed at a lower side of the circuit breakers.

9. The vacuum insulated switchgear according to claim 4, wherein:
each fixed contact of the circuit breakers in the busbar compartment and the feeder compartments are disposed at a higher side of the movable contact of the circuit breakers, and the insulated busbar is disposed at an upper side of the circuit breakers.

* * * * *